United States Patent [19]
Fey et al.

[11] 3,992,193
[45] Nov. 16, 1976

[54] METAL POWDER PRODUCTION BY DIRECT REDUCTION IN AN ARC HEATER

[75] Inventors: Maurice G. Fey, Pittsburgh, Pa.; Edna A. Dancy, Beaconsfield, Canada

[73] Assignee: Westinghouse Electric Corporation, Pittsburgh, Pa.

[22] Filed: Mar. 10, 1975

[21] Appl. No.: 557,154

[52] U.S. Cl. ............................ 75/.5 B; 75/.5 BB; 75/10 R
[51] Int. Cl.² .......................................... B22F 9/00
[58] Field of Search ................ 75/.5 BB, .5 B, 10 R

[56] References Cited
UNITED STATES PATENTS

| | | | |
|---|---|---|---|
| 3,475,158 | 10/1969 | Nevenschwander | 75/.5 BB |
| 3,695,795 | 10/1972 | Jossick | 75/.5 C |
| 3,765,870 | 10/1973 | Fey et al. | 75/10 R |

*Primary Examiner*—W. Stallard
*Attorney, Agent, or Firm*—L. P. Johns

[57] ABSTRACT

A process for the production of metal powder from an ore by direct reduction in an arc heater characterized by the steps of introducing a finely divided ore into an arc heated plasma gas to effect reduction of the ore to small liquid droplets of elemental metal in a reducing atmosphere and quenching the metal droplets to form solid metal powder, the metal having a melting point of not more than the temperature of the chemical reduction reaction, such metal being iron, chromium, vanadium, manganese, cobalt or nickel.

1 Claim, 2 Drawing Figures

METAL POWDER PRODUCTION BY DIRECT REDUCTION IN AN ARC HEATER

CROSS REFERENCE TO RELATED APPLICATION

This invention is related to the copending application of Maurice G. Fey and Edna Dancy, entitled "Metal Powder Production By Direction Reduction In An Arc Heater" Ser. No. 557,155, filed Mar. 10, 1975 (W. E. Case 45,872).

BACKGROUND OF THE INVENTION

1. Field of the Invention

This invention relates to a process for the direct reduction of metal oxide to liquid droplets of the metal in arc heated plasma gas.

2. Description of the Prior Art

In the metal fabrication industry there is a sustained need for metal powders. For example, there is an increasingly large demand for iron powder for the fabrication of small items such as automobile door handles. Manifestly, it is economically unfeasible to manufacture these small items by going through the large ingot stage.

It is more desirable to produce the metal powder from an ore which is provided in a finely divided form so that the metal is produced in the form of a small particle and is thereby available for fabrication of small parts. Prior attempts to produce metal powder in the desired form directly from metal ore have been less than satisfactory.

SUMMARY OF THE INVENTION

In accordance with this invention, it has been found that the problems inherent in prior attempts to produce metal powders may be overcome by the steps of introducing a finely divided ore consisting essentially of an oxide of at least one metal into the arc heated plasma gas of an arc heater in a reducing atmosphere to reduce the oxide in the ore to small elemental liquid metal droplets, the melting point of the metal being less than or equal to the temperature of the arc heated plasma gas, (such as at the temperature of the chemical reduction reaction of the metal oxide to elemental metal), and then quenching the droplets to form a metal powder.

The advantage of the process of this invention is that powdered ores may be reduced in an arc heater in a fast moving gas stream to liquid metal droplets which are then quenched to form solid metal particles that are readily available for fabrication of small metal parts.

DESCRIPTION OF THE PREFERRED EMBODIMENT

In accordance with the present invention, the process is carried out in the following sequential manner:

1. Introducing an ore of finely divided particles consisting essentially of an oxide of the metal to be produced into an arc heated plasma gas in a reducing atmosphere, such as methane, to effect reduction of the oxide to small droplets of elemental metal, and 2. quenching the droplets of elemental metal either by a non-oxidizing gas or by expansion through a nozzle to form metal powder.

Figure 1:
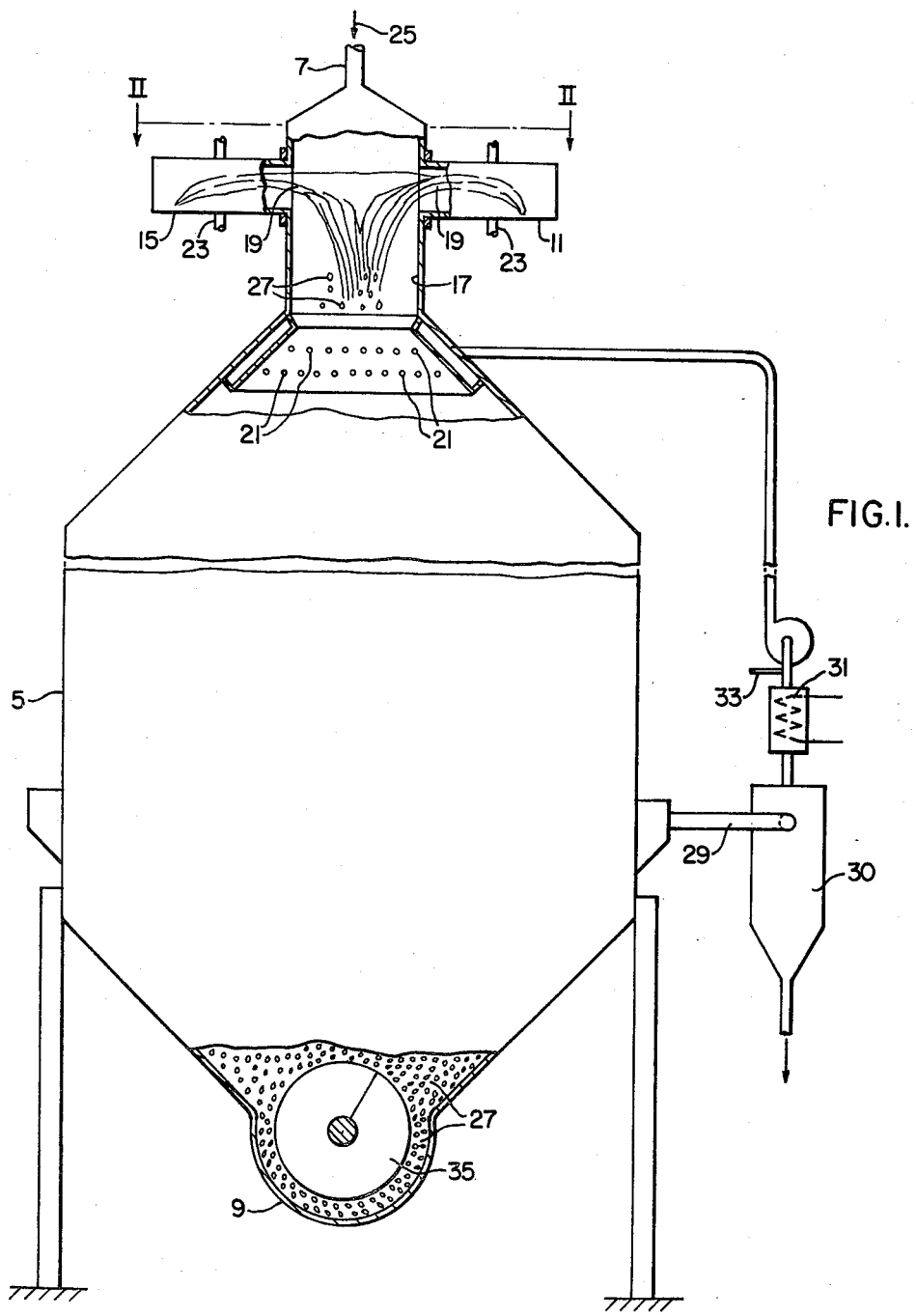
FIG. 1 is a diagrammatic view of a device for practicing the process of this invention.
Figure 2:
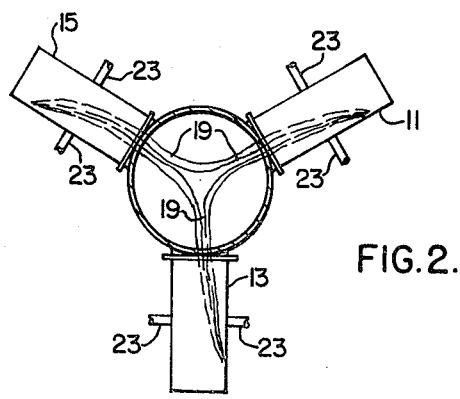
FIG. 2 is a horizontal sectional view taken on the line II—II of FIG. 1.

The process of this invention may be carried out in a structure characterized by that shown in FIG. 1 in which a reactor or collecting vessel 5 is provided with an inlet 7 at the upper end and an outlet 9 at the lower end. The structure also comprises arc heater means including at least one and preferably three arc heaters 11, 13, 15 (FIG. 2). The reactor or vessel 5 is composed of a suitable material, such as metal, the upper end of which includes a reduced cylindrical portion or chamber 17 with which the inlet 7 communicates. The exit ends of the arc heaters 11, 13, 15 (FIG. 2) likewise communicate with the plenum chamber 17 so that similar plasma jet streams 19 extend from each of the arc heaters into the plenum chamber. In addition, quenching means such as spray nozzles 21 are disposed around the vessel 5 and below the positions of the arc heaters 11, 13, 15, whereby a fluid of quenching material, such as an inert gas, is injected into the vessel 5.

The arc heaters 11, 13, 15 are similar in construction and operation to that disclosed in U.S. Pat. No. 3,765,870, entitled "Method of Direct Ore Reduction Using a Short Gap Arc Heater" of which the inventors are Maurice G. Fey and George A. Kemeny. Because of the full disclosure in that patent, the description of the arc heaters 11, 13, 15 is limited herein to the basic structure and operation. The arc heaters 11, 13, 15 (FIG. 2) are each a single phase, self-stabilizing AC device capable of power levels up to about 3500 kilowatts for up to about 10,000 kilowatts for a three phase plant installation. In the practice of this invention it is preferred that three arc heaters be provided, one for each of the three phases of the AC power supply. Two arc heaters 11, 15 are shown in FIG. 1.

During operation of the arc heaters 11, 13, 15, a reducing gas, such as methane, is introduced into the arc heaters through peripherally disposed inlets 23 which gas comprises a greater portion of the plasma jet streams that enter the chamber 17.

Finely divided ore 25, such as iron oxide ($Fe_2O_3$ and $Fe_3O_4$), is introduced into the plenum chamber 17 via the inlet 7. In the plenum chamber 17, the ore 25 enters the plasma jet stream 19 where, in the presence of the reducing gas atmosphere (methane), the ore is reduced to elemental metal, for example, iron. Upon reduction of the ore to the elemental metal state, small droplets of the liquid metal form and drop from the plenum chamber to the lower end of the vessel 5. In accordance with this invention, the droplets 27 of metal pass through a quenching zone which comprises jets of reducing gas, such as a mixture of CO and $H_2$, emitted into the vessel 5 through the spaced nozzles 21 which reducing gas is introduced through the nozzles at temperatures considerably below the melting point of the elemental metal. Additional quenching occurs by radiation of the hot molten particles 27 to the cold wall of the vessel 5. For example, the melting point of iron is 2795° F so that the temperature of the coolant reducing gas is considerably below 2795° F in order to accomplish solidification of the droplets 27 before they drop to the bottom of the vessel 5.

As an alternative the droplets 27 of metal may be quenched by providing for cooling of the gas as it passes through an expansion nozzle (not shown) at the chamber exit. As a further alternative, the droplets may be quenched by passing through a nozzle and then through the gas atmosphere as set forth above. The gas solids pass through the expansion nozzle. As the gas is cooled by expansion, the entrained particles transfer their latent heat of fusion to the gas and become solidified.

The reaction of the metal oxide or ore with a reductant, such as methane ($CH_4$), is shown in the following formula:

$$Fe_2O_3 + 3CH_4 \rightarrow 2Fe + 3CO + 6H_2$$

The carbon monoxide and hydrogen gas mixture resulting from that reaction is removed from the vessel 5 through an outlet conduit 29 which conduit passes through a cyclone particle separator 30 and then a coil 31 of the heat exchanger for withdrawing the heat from the gases, a portion of which gases are then returned to the nozzles 21 and the balance is removed from the system through a vent 33. As the solidified metal particles collect at the bottom of the vessel 5, they may be withdrawn through the outlet 9 in a suitable manner such as by a screw conveyor 35.

In conclusion, the foregoing process provides a means for the production of metal powder directly from an ore in an arc heater. Although an example for the production of iron is disclosed, it is understood that other metals having melting points up to and including the temperature of the plasma gas such as chromium having a melting point of 3505° F and vanadium, having a melting point of 3110° F, may likewise be produced in metal powder form. By using appropriately mixed oxides (naturally occurring or artificially mixed) alloy powders, such as ferroalloy powders, can be produced. The demand for metal powders is high. Since ore is in a finely divided form, the metal produced is in the droplet or small particle form and has only to be quenched. This procedure is distinguished from many powder making processes in which molten metal must be first atomized.

What is claimed is:

1. A process for producing metal powder by direct reduction of an ore, comprising the steps of:
   a. introducing a finely divided ore consisting essentially of an oxide of the metal into an arc heated plasma gas to effect reduction of the oxide to elemental liquid metal droplets, the elemental metal having a melting point of not more than the temperature of the chemical reduction reaction, and
   b. quenching the elemental metal droplets by expansion through a nozzle, the nozzle being located at the exit end of the reaction zone.

* * * * *